US012794297B2

(12) United States Patent
Hirasawa et al.

(10) Patent No.: US 12,794,297 B2
(45) Date of Patent: Nov. 10, 2026

(54) COIL SUBSTRATE, MOTOR COIL SUBSTRATE, AND MOTOR

(71) Applicant: IBIDEN CO., LTD., Ogaki (JP)

(72) Inventors: Takahisa Hirasawa, Ogaki (JP); Takayuki Furuno, Ogaki (JP)

(73) Assignee: IBIDEN CO., LTD., Ogaki (JP)

(*) Notice: Subject to any disclaimer, the term of this patent is extended or adjusted under 35 U.S.C. 154(b) by 209 days.

(21) Appl. No.: 18/431,255

(22) Filed: Feb. 2, 2024

(65) Prior Publication Data

US 2024/0178713 A1 May 30, 2024

Related U.S. Application Data

(63) Continuation of application No. PCT/JP2022/029720, filed on Aug. 2, 2022.

(30) Foreign Application Priority Data

Aug. 3, 2021 (JP) ................................ 2021-127282

(51) Int. Cl.
*H02K 3/04* (2006.01)
*H02K 3/32* (2006.01)
*H02K 7/00* (2006.01)

(52) U.S. Cl.
CPC ................ *H02K 3/04* (2013.01); *H02K 3/32* (2013.01); *H02K 7/003* (2013.01)

(58) Field of Classification Search
CPC .. H02K 3/04; H02K 3/32; H02K 3/26; H02K 3/47; H02K 7/003; H02K 2203/03; H02K 2211/03; H01F 5/04; H01F 41/04
USPC .......................................................... 310/208
See application file for complete search history.

(56) References Cited

U.S. PATENT DOCUMENTS

| | | | | |
|---|---|---|---|---|
| 4,665,331 A * | 5/1987 | Sudo | H02K 3/26 | 310/40 MM |
| 5,493,157 A * | 2/1996 | Nakamura | H02K 29/03 | 310/67 R |
| 2011/0140564 A1* | 6/2011 | Nomura | H01F 41/041 | 336/200 |

(Continued)

FOREIGN PATENT DOCUMENTS

| | | |
|---|---|---|
| JP | S62-272837 A | 11/1987 |
| JP | 2020-061532 A | 4/2020 |

(Continued)

OTHER PUBLICATIONS

International Search Report issued Sep. 13, 2022 in PCT/JP2022/029720, filed Aug. 2, 2022, 5 pages.

(Continued)

*Primary Examiner* — Michael Andrews
(74) *Attorney, Agent, or Firm* — Finnegan, Henderson, Farabow, Garrett & Dunner, LLP

(57) ABSTRACT

A coil substrate includes a flexible substrate, and a coil including a first wiring formed on a first surface of the flexible substrate and a second wiring formed on a second surface of the flexible substrate on the opposite side with respect to the first surface of the flexible substrate. The coil is formed such that an inter-wiring distance of the first wiring formed on the first surface of the flexible substrate is larger than an inter-wiring distance of the second wiring formed on the second surface of the flexible substrate.

20 Claims, 4 Drawing Sheets

(56) References Cited

U.S. PATENT DOCUMENTS

| | | | | |
|---|---|---|---|---|
| 2013/0009511 | A1* | 1/2013 | Dieleman ................ | H02K 3/26<br>29/596 |
| 2024/0195252 | A1* | 6/2024 | Hirasawa ................. | H02K 3/47 |

FOREIGN PATENT DOCUMENTS

| | | | |
|---|---|---|---|
| JP | 2020-171111 | A | 10/2020 |
| WO | WO 2007/014570 | A1 | 2/2007 |
| WO | WO 2018/199150 | A1 | 11/2018 |

OTHER PUBLICATIONS

Extended European Search Report mailed Jul. 4, 2025 in corresponding European Application No. 22853077.0 (10 pages).

International Preliminary Report on Patentability issued Feb. 6, 2024 in PCT/JP2022/029720, filed Aug. 2, 2022, 5 pages, document cited therein has been previously submitted.

* cited by examiner

COIL SUBSTRATE, MOTOR COIL SUBSTRATE, AND MOTOR

CROSS-REFERENCE TO RELATED APPLICATIONS

The present application is a continuation of and claims the benefit of priority to International Application No. PCT/JP2022/029720, filed Aug. 2, 2022, which is based upon and claims the benefit of priority to Japanese Application No. 2021-127282, filed Aug. 3, 2021. The entire contents of these applications are incorporated herein by reference.

BACKGROUND OF THE INVENTION

Field of the Invention

The present invention relates to a coil substrate, a motor coil substrate formed using the coil substrate, and a motor formed using the motor coil substrate.

Description of Background Art

Japanese Patent Application Laid-Open Publication No. 2020-61532 describes a coil substrate having a flexible substrate and spiral-shaped wirings formed on both sides of the flexible substrate. The entire contents of this publication are incorporated herein by reference.

SUMMARY OF THE INVENTION

According to one aspect of the present invention, a coil substrate includes a flexible substrate, and a coil including a first wiring formed on a first surface of the flexible substrate and a second wiring formed on a second surface of the flexible substrate on the opposite side with respect to the first surface of the flexible substrate. The coil is formed such that an inter-wiring distance of the first wiring formed on the first surface of the flexible substrate is larger than an inter-wiring distance of the second wiring formed on the second surface of the flexible substrate.

According to another aspect of the present invention, a coil substrate includes a flexible substrate, and multiple coils each including a first wiring formed on a first surface of the flexible substrate and a second wiring formed on a second surface of the flexible substrate on the opposite side with respect to the first surface of the flexible substrate. The coils are formed such that an inter-wiring distance of the first wiring formed on the first surface of the flexible substrate is larger than an inter-wiring distance of the second wiring formed on the second surface of the flexible substrate.

According to yet another aspect of the present invention, a motor coil substrate includes a coil substrate wound in a cylindrical shape and including a flexible substrate and one or more coils including a first wiring formed on a first surface of the flexible substrate and a second wiring formed on a second surface of the flexible substrate on the opposite side with respect to the first surface of the flexible substrate. The coil substrate is formed such that the first surface of the flexible substrate is positioned on the inner peripheral side of the cylindrical shape and that the second surface of the flexible substrate is positioned on the outer peripheral side of the cylindrical shape, and the coil substrate is wound in the cylindrical shape such that a distance between top portions of the first wiring on the first surface of the flexible substrate is substantially equal to a distance between bottom portions of the second wiring on the second surface of the flexible substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
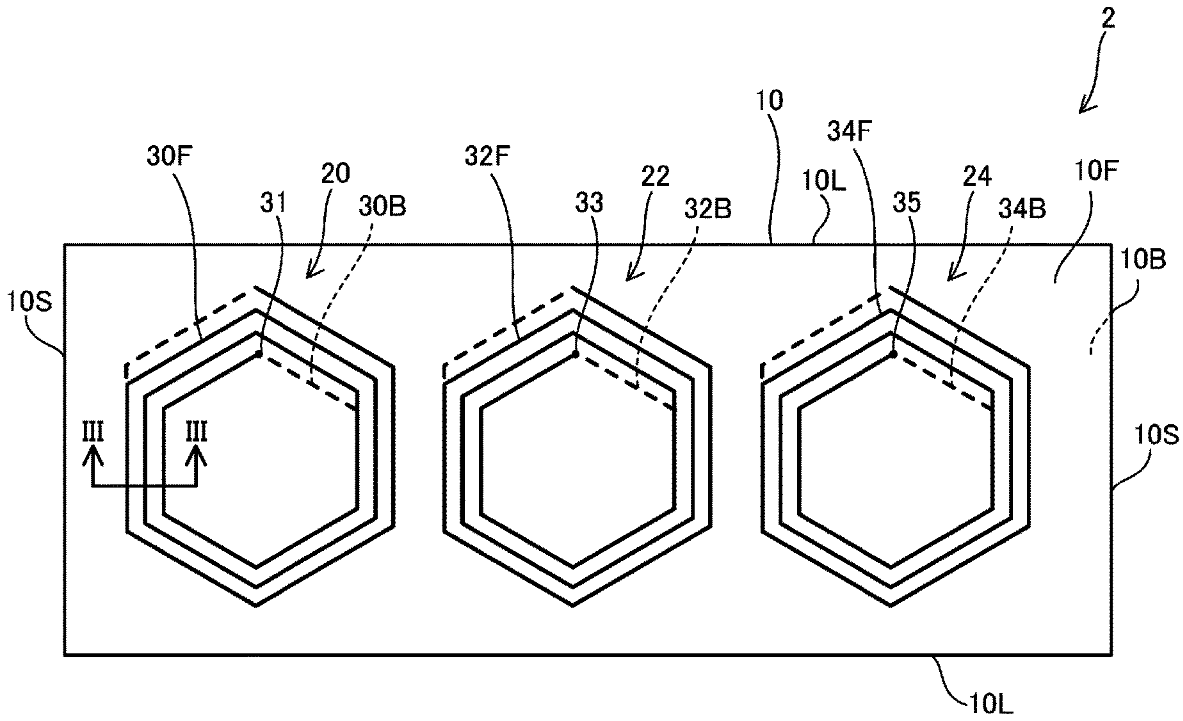
FIG. 1 is a plan view schematically illustrating a coil substrate according to an embodiment of the present invention.

Embodiments will now be described with reference to the accompanying drawings, wherein like reference numerals designate corresponding or identical elements throughout the various drawings.

EMBODIMENT

Figure 2:
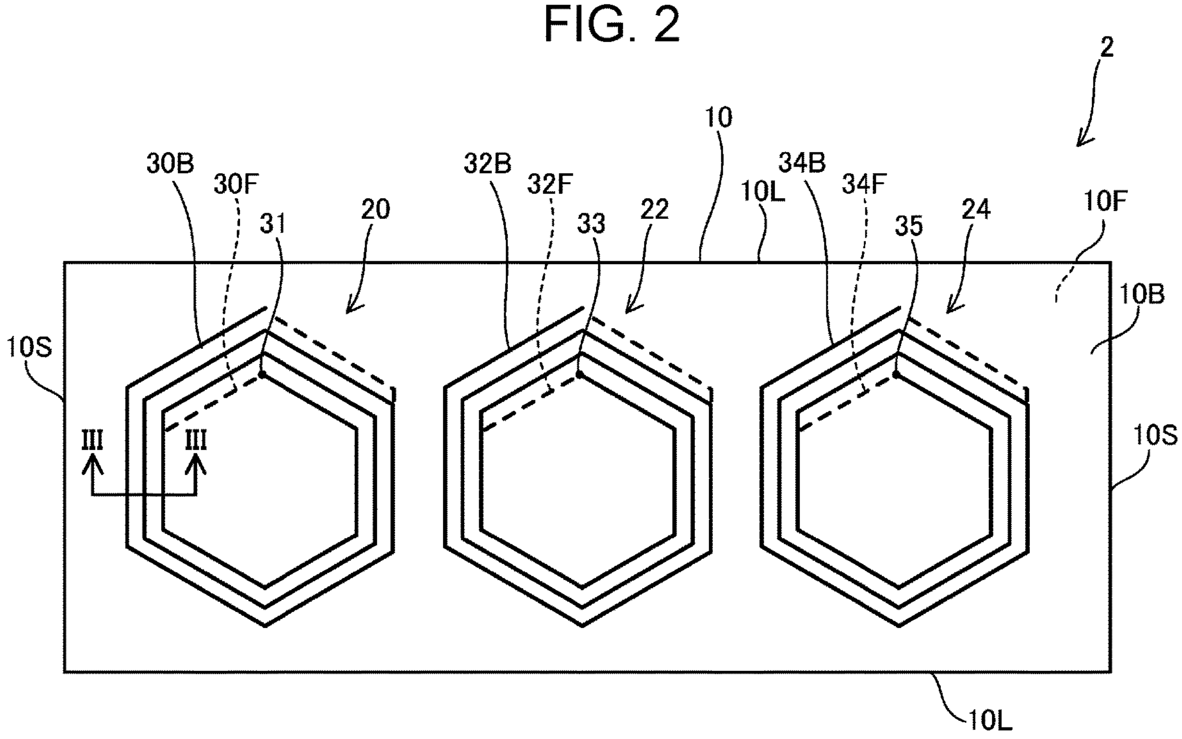
FIG. 2 is a bottom view schematically illustrating a coil substrate according to an embodiment of the present invention.

FIG. 1 is a plan view illustrating a coil substrate 2 of an embodiment. FIG. 2 is a bottom view illustrating the coil substrate 2 of the embodiment. The coil substrate 2 has a flexible substrate 10 and multiple coils (20, 22, 24).

The flexible substrate 10 is a resin substrate having a first surface (10F) and a second surface (10B) on the opposite side with respect to the first surface (10F). The flexible substrate 10 is formed using an insulating resin such as polyimide or polyamide. The flexible substrate 10 is flexible. The flexible substrate 10 is formed in a rectangular shape having short sides (10S) and long sides (10L).

The coils (20, 22, 24) are formed along the long sides (10L) of the flexible substrate 10. In the embodiment, the flexible substrate 10 is provided with three coils (20, 22, 24). However, in a modified example, the flexible substrate 10 may be provided with two or three or more coils.

The coil 20 is formed of a coil-shaped first wiring (30F) (FIG. 1) provided on the first surface (10F) and a coil-shaped second wiring (30B) (FIG. 2) provided on the second surface (10B). The first wiring (30F) and the second wiring (30B) are electrically connected via a via conductor 31 penetrating the flexible substrate 10. Similarly, the coil 22 is formed of a coil-shaped first wiring (32F) and a coil-shaped second wiring (32B). The first wiring (32F) and the second wiring (32B) are electrically connected via a via conductor 33 penetrating the flexible substrate 10. The coil 24 is formed of a coil-shaped first wiring (34F) (FIG. 1) and a coil-shaped second wiring (34B) (FIG. 2). The first wiring (34F) and the second wiring (34B) are electrically connected via a via conductor 35 penetrating the flexible substrate 10.

As illustrated in FIG. 1, the first wiring (30F) is formed in a clockwise spiral shape (hexagonal spiral shape) from an outer periphery toward an inner periphery. A connection terminal for connecting a connection cord (not illustrated) that connects the first wiring (30F) and outside is formed at an outer peripheral side end of the first wiring (30F). The via conductor 31 is formed at an inner peripheral side end of the first wiring (30F). As illustrated in FIG. 2, the second wiring (30B) is formed in a counterclockwise spiral shape (hexagonal spiral shape) from an outer periphery toward an inner periphery. A connection terminal for connecting a connection cord (not illustrated) that connects the second wiring (30B) and outside is formed at an outer peripheral side end of the second wiring (30B). The via conductor 31 is formed at an inner peripheral side end of the second wiring (30B). The first wiring (30F) and the second wiring (30B) are formed in spiral shapes wound in the same direction when viewed from the same surface. The first wiring (30F) and the second wiring (30B) are electrically connected in series and function as one coil 20.

The first wiring (32F) and the second wiring (32B), as well as the first wiring (34F) and the second wiring (34B), have the same relationship as the first wiring (30F) and the second wiring (30B) described above. The first wiring (32F) and the second wiring (32B) are formed in spiral shapes wound in the same direction when viewed from the same surface. The first wiring (32F) and the second wiring (32B) are electrically connected in series and function as one coil 22. The first wiring (34F) and the second wiring (34B) are formed in spiral shapes wound in the same direction when viewed from the same surface. The first wiring (34F) and the second wiring (34B) are electrically connected in series and function as one coil 24.

Although not illustrated, the first surface (10F) and the first wirings (30F, 32F, 34F) are covered with a resin insulation layer. Similarly, the second surface (10B) and the second wirings (30B, 32B, 34B) are covered with a resin insulation layer.

Figure 3:
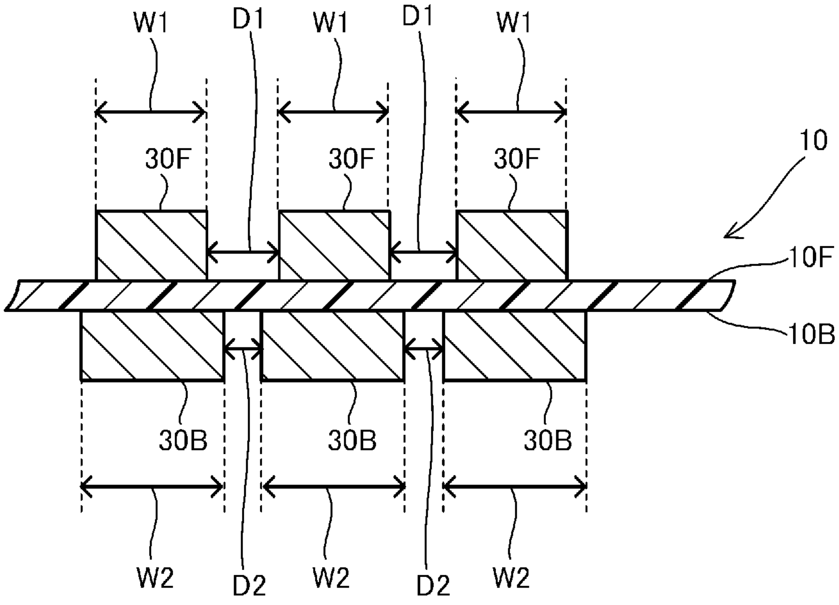
FIG. 3 is a cross-sectional view schematically illustrating a portion of a coil substrate according to an embodiment of the present invention.

FIG. 3 is a cross-sectional view of a portion of the coil substrate 2. FIG. 3 is a cross-sectional view between III-III of FIGS. 1 and 2. With reference to FIG. 3, a structure of the coil 20 (the first wiring (30F) and the second wiring (30B)) is described in detail. FIG. 3 illustrates a cross-sectional view of a portion of the coil 20. The coils (22, 24) each have a similar structure.

As illustrated in FIG. 3, when the first wiring (30F) on the first surface (10F) and the second wiring (30B) on the second surface are projected onto the first surface (10F) with light perpendicular to the first surface (10F), the first wiring (30F) and the second wiring (30B) overlap each other. That is, the first wiring (30F) on the first surface (10F) and the second wiring (30B) on the second surface (10B) overlap each other via the flexible substrate 10 in a thickness direction (vertical direction in the drawing). An inter-wiring distance (D1) of the first wiring (30F) is larger than an inter-wiring distance (D2) of the second wiring (30B). A width (W1) of the first wiring (30F) is smaller than a width (W2) of the second wiring (30B).

Figure 4:
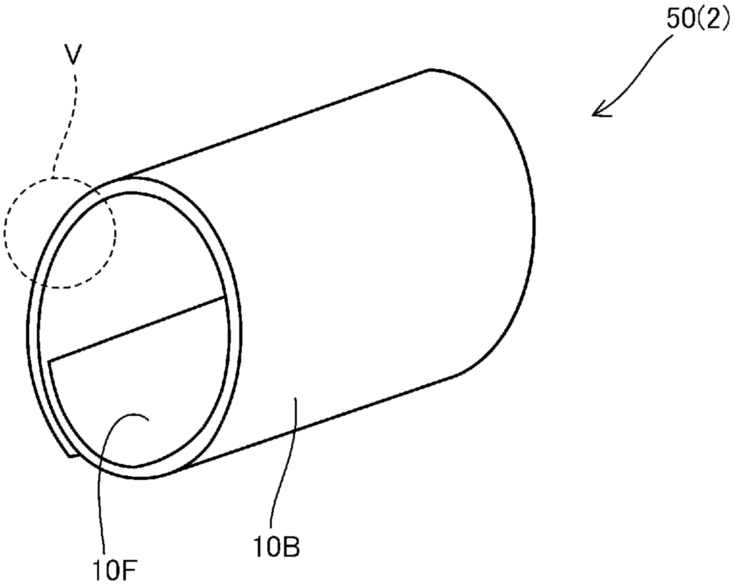
FIG. 4 is a perspective view schematically illustrating a motor coil substrate according to an embodiment of the present invention.

FIG. 4 is a perspective view schematically illustrating a motor coil substrate 50 formed using the coil substrate 2 of the embodiment (FIGS. 1-3). As illustrated in FIG. 4, the motor coil substrate 50 for a motor is formed by winding the coil substrate 2 of the embodiment (FIGS. 1-3) into a cylindrical shape. When the coil substrate 2 is wound into a cylindrical shape, with one end side of the long sides (10L) (FIGS. 1 and 2) as a starting point, the coil substrate 2 is wound in a circumferential direction around an axis parallel to the short side (10S) on the one end side. The coil substrate 2 is wound in multiple turns.

Figure 5:
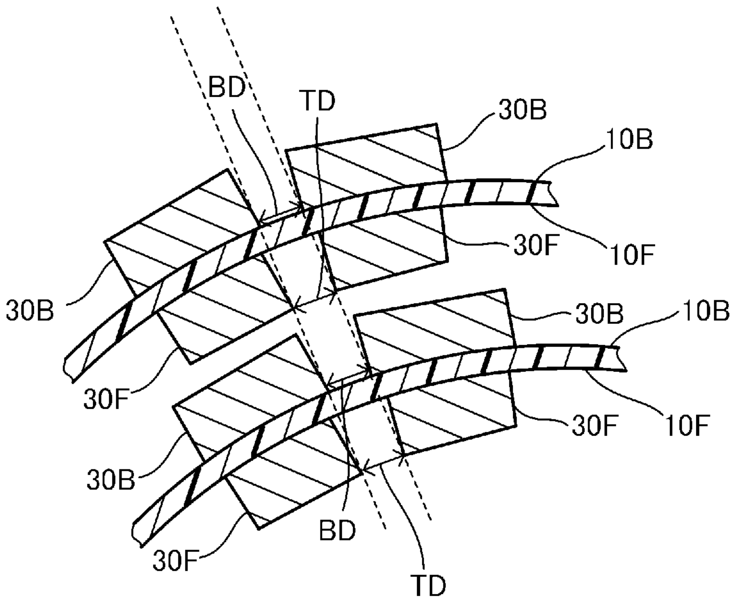
FIG. 5 is an enlarged explanatory diagram of a portion of FIG. 4.

FIG. 5 is an enlarged explanatory diagram of a portion (V) of FIG. 4. As illustrated in FIGS. 4 and 5, in the motor coil substrate 50 of the embodiment, when the coil substrate 2 is wound into a cylindrical shape, the first surface (10F) is positioned on an inner peripheral side and the second surface (10B) is positioned on an outer peripheral side. As illustrated in FIG. 5, a distance (TD) between top portions of the first wiring (30F) positioned on the inner peripheral side is substantially equal to a distance (BD) between bottom portions of the second wiring (30B) positioned on the outer peripheral side. The top portions of the first wiring (30F) are highest portions of the first wiring (30F) from the first surface (10F). The bottom portions of the second wiring (30B) are portions of the second wiring (30B) that are in contact with the second surface (10B). The distances (TD, BD) are each, for example, 10 μm or more and 50 μm or less (preferably 15 μm or more and 30 μm or less).

Figure 6:
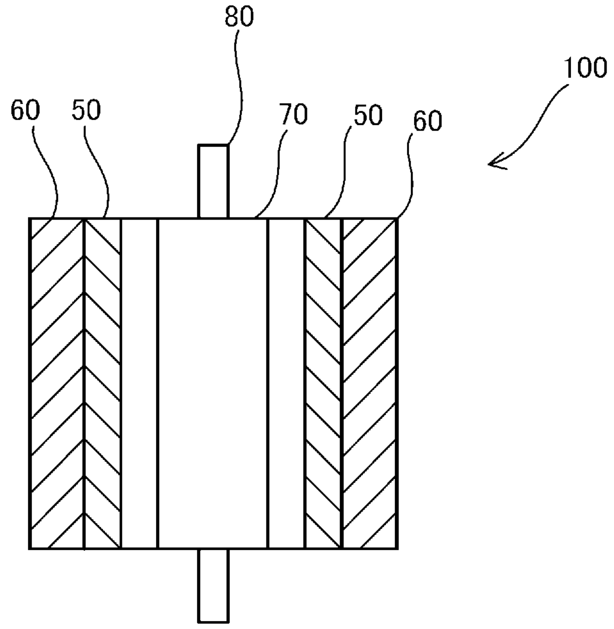
FIG. 6 is a cross-sectional view schematically illustrating a motor according to an embodiment of the present invention.

FIG. 6 is a cross-sectional view schematically illustrating a motor 100 formed using the motor coil substrate 50 of the embodiment (FIGS. 4 and 5). The motor 100 is formed by positioning the motor coil substrate 50 on an inner side of a yoke 60, and positioning a rotation shaft 80 and a magnet 70 fixed to the rotation shaft 80 on an inner side of the motor coil substrate 50.

In the above, the structures of the coil substrate 2 (FIGS. 1-3), the motor coil substrate 50 (FIGS. 4 and 5), and the motor 100 (FIG. 6) of the embodiment have been described. As described above, in the coil substrate 2 of the embodiment, the inter-wiring distance (D1) of the first wiring (30F) is larger than the inter-wiring distance (D2) of the second wiring (30B). The width (W1) of the first wiring (30F) is smaller than the width (W2) of the second wiring (30B). When the first wiring (30F) on the first surface (10F) and the second wiring (30B) on the second surface are projected onto the first surface (10F) with light perpendicular to the first surface (10F), the first wiring (30F) and the second wiring (30B) overlap each other. Therefore, when the motor coil substrate 50 is formed using the coil substrate 2 of the embodiment (FIGS. 4 and 5), the inter-wiring distance of the first wiring (30F) positioned on the inner peripheral side is maintained and wirings do not come into contact with each other. Even when a high voltage is applied, occurrence of a short circuit between the first wiring (30F) is suppressed. When the motor 100 is formed using the coil substrate 2 (the motor coil substrate 50) (FIG. 6), a withstand voltage of the motor 100 is ensured, and a motor 100 with stable performance is obtained.

Further, in the motor coil substrate 50 formed by winding the coil substrate 2 into a cylindrical shape, when the coil substrate 2 is wound into a cylindrical shape, the top portions of the first wiring (30F) positioned on the inner peripheral side are closest to each other, and the bottom portions of the second wiring (30B) positioned on the outer peripheral side are closest to each other (FIG. 5). In the motor coil substrate 50, the distance (TD) between the top portions of the first wiring (30F) is maintained approximately equal to the distance (BD) between the bottom portions of the second wiring (30B) (FIG. 5). Therefore, even when a high voltage is applied, occurrence of a short circuit between the first wiring (30F) is suppressed. Further, since the distance between the second wirings (30B) is not excessively large, a space factor of the motor coil substrate 50 can also be maintained high. By forming the motor 100 using the motor coil substrate 50, a motor 100 with more stable performance is obtained. The distance (TD) is an example of a "first distance". The distance (BD) is an example of a "second distance".

First Modified Example

Figure 7:
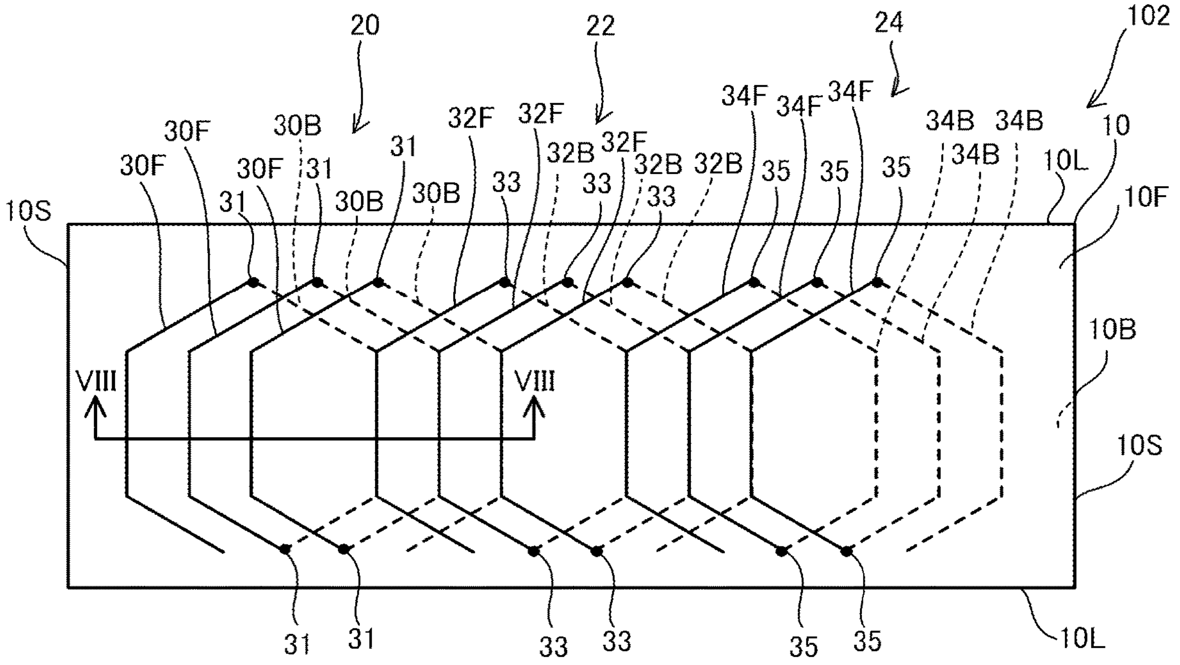
FIG. 7 is a plan view schematically illustrating a coil substrate of a first modified example according to an embodiment of the present invention.
Figure 8:
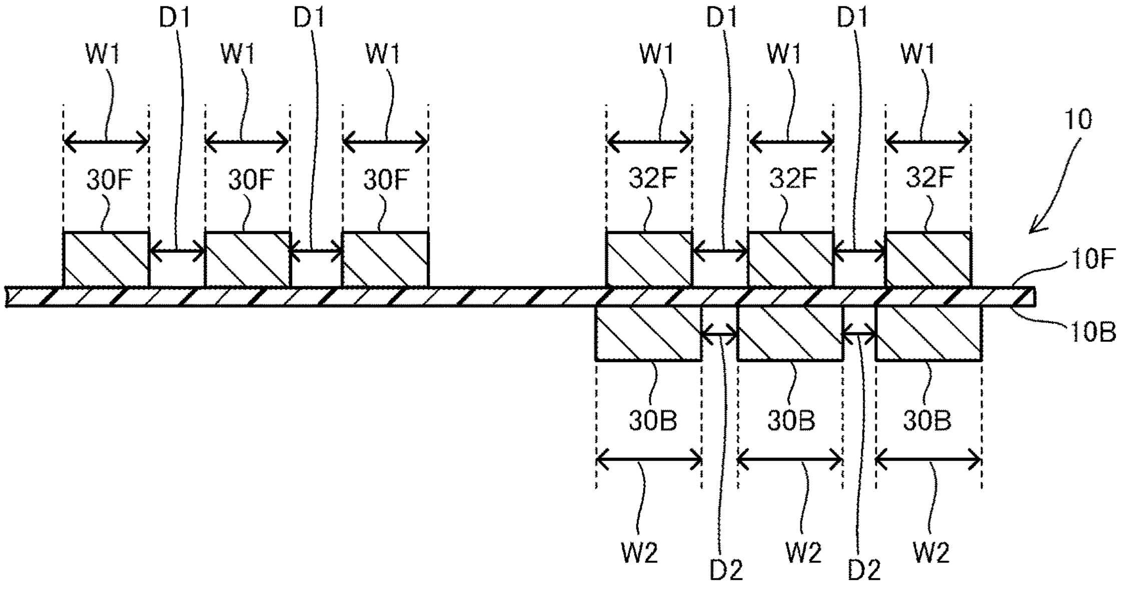
FIG. 8 is a cross-sectional view schematically illustrating a portion of the coil substrate of the first modified example.

FIGS. 7 and 8 illustrate a first modified example of the embodiment. In the first modified example, the formation of the wirings forming the coils (20, 22, 24) is different from that in the embodiment. FIG. 7 is a plan view illustrating a coil substrate 102 of the first modified example. As illustrated in FIG. 7, the coil 20 is formed by that a first wiring (30F) forming a half turn of one turn is formed on the first surface (10F) side, a second wiring (30B) forming the remaining half turn is formed on the second surface (10B) side, and adjacent turns are formed in a staggered manner. In FIG. 7, the coil 20 has wirings for three turns. The first wiring (30F) and the second wiring (30B) that form each turn are electrically connected via a via conductor 31 penetrating the flexible substrate 10.

Similarly, the coil 22 is formed by that a first wiring (32F) forming a half turn of one turn is formed on the first surface (10F) side, a second wiring (32B) forming the remaining half turn is formed on the second surface (10B) side, and adjacent turns are formed in a staggered manner. The coil 22 has 3 turns. The first wiring (32F) and the second wiring (32B) that form each turn are electrically connected via a via conductor 33. The coil 24 is formed by that a first wiring (34F) forming a half turn of one turn is formed on the first surface (10F) side, a second wiring (34B) forming the remaining half turn is formed on the second surface (10B) side, and adjacent turns are formed in a staggered manner. The coil 24 has 3 turns. The first wiring (34F) and the second wiring (34B) that form each turn are electrically connected via a via conductor 35.

As illustrated in FIG. 7, portions of the second wirings (30B) forming the coil 20 respectively overlap with portions of the first wirings (32F) forming the adjacent coil 22 via the flexible substrate 10. Portions of the second wirings (32B) forming the coil 22 respectively overlap with portions of the first wirings (34F) forming the adjacent coil 24 via the flexible substrate 10. The formation in FIG. 7 is an example. In other modified examples, it is also possible that portions of the second wirings (30B) forming the coil 20 do not need to respectively overlap with portions of the first wirings (32F) forming the adjacent coil 22. It is also possible that portions of the second wirings (32B) forming the coil 22 do not need to respectively overlap with portions of the first wirings (34F) forming the adjacent coil 24.

FIG. 8 is a cross-sectional view illustrating a portion of the coil substrate 102 of the first modified example. FIG. 8 is a cross-sectional view between VIII-VIII of FIG. 7. Even in the coil substrate 102 of the first modified example, the inter-wiring distance (D1) of the first wirings (30F, 32F) is larger than the inter-wiring distance (D2) of the second wiring (30B). The width (W1) of the first wirings (30F, 32F) is smaller than the width (W2) of the second wiring (30B).

When the motor coil substrate 50 is formed using the coil substrate 102 of the first modified example (FIG. 4), the inter-wiring distance of the first wiring (30F) positioned on the inner peripheral side is maintained. Even when a high voltage is applied, occurrence of a short circuit between the first wiring (30F) is suppressed. When the motor 100 is formed using the coil substrate 102 (the motor coil substrate 50) (FIG. 6), a withstand voltage of the motor 100 is ensured, and a motor 100 with stable performance is obtained.

Second Modified Example

In a second modified example, the width (W1) of the first wiring (30F) (see FIGS. 3 and 8) is substantially equal to the width (W2) of the second wiring (30B). Even in this case, the inter-wiring distance (D1) of the first wiring (30F) is larger than the inter-wiring distance (D2) of the second wiring (30B).

Japanese Patent Application Laid-Open Publication No. 2020-61532 describes a coil substrate having a flexible substrate and spiral-shaped wirings formed on both sides of the flexible substrate. A motor coil substrate is formed by winding the coil substrate into a cylindrical shape. A motor is formed by positioning the formed motor coil substrate on an inner side of a cylindrical yoke and positioning a rotation shaft and a magnet on an inner side of the motor coil substrate.

In the technology of Japanese Patent Application Laid-Open Publication No. 2020-61532, when the coil substrate is wound into a cylindrical shape, as the flexible substrate deforms, wirings positioned on an inner peripheral side come close to each other. Therefore, when a high voltage is applied, it is considered that a short circuit may occur between wirings that have come close to each other.

A coil substrate according to an embodiment of the present invention includes a flexible substrate that has a first surface and a second surface on the opposite side with respect to the first surface, and a coil that is formed by a coil-shaped wiring provided on the first surface and a coil-shaped wiring provided on the second surface. An inter-wiring distance of the wiring on the first surface is larger than an inter-wiring distance of the wiring on the second surface.

In the coil substrate according to an embodiment of the present invention, the inter-wiring distance of the wiring on the first surface is larger than the inter-wiring distance of the wiring on the second surface. Therefore, when the coil substrate is wound into a cylindrical shape with the first surface positioned on the inner peripheral side and the second surface positioned on the outer peripheral side to form a motor coil substrate, the distance between wirings on the first surface is maintained and the wirings do not come into contact with each other. Even when a high voltage is applied, occurrence of a short circuit between the wirings on the first surface can be suppressed. When a motor is formed using the coil substrate, a withstand voltage of the motor is ensured, and a motor with stable performance is obtained.

A motor coil substrate according to an embodiment of the present invention is formed by winding the above coil substrate according to an embodiment of the present invention into a cylindrical shape. The first surface is positioned on an inner peripheral side, and the second surface is positioned on an outer peripheral side.

In the motor coil substrate according to an embodiment of the present invention, the distance between the wirings on the first surface is maintained and the wirings do not come into contact with each other. Even when a high voltage is applied, occurrence of a short circuit between the wirings on the first surface can be suppressed. When a motor is formed using the motor coil substrate, a withstand voltage of the motor is ensured, and a motor with stable performance is obtained.

Another motor coil substrate according to an embodiment of the present invention is formed by winding a coil substrate into a cylindrical shape, the coil substrate having a flexible substrate and a coil, the flexible substrate having a first surface and a second surface on the opposite side with respect to the first surface, and the coil being formed by a coil-shaped wiring provided on the first surface and a coil-shaped wiring provided on the second surface. The first surface is positioned on an inner peripheral side. The second surface is positioned on an outer peripheral side. A first distance between top portions of the wiring on the first surface is substantially equal to a second distance between bottom portions of the wiring on the second surface positioned on the outer peripheral side.

When the coil substrate is wound into a cylindrical shape, the top portions of the wiring on the first surface on the inner peripheral side are closest to each other, and the bottom portions of the wiring on the second surface on the outer peripheral side are closest to each other. In another motor coil substrate according to an embodiment of the present invention, the first distance between the top portions of the wiring on the first surface and the second distance between the bottom portions of the wiring on the second surface are maintained substantially equal to each other. Even when a high voltage is applied, occurrence of a short circuit between the wirings on the first surface can be suppressed. Further, since the distance between the wirings on the second surface is not excessively large, a space factor of the motor coil substrate can also be maintained high. When a motor is formed using the motor coil substrate, a withstand voltage of the motor is ensured, and a motor with stable performance is obtained.

A motor according to an embodiment of the present invention is formed by positioning the above motor coil substrate according to an embodiment of the present invention on an inner side of a cylindrical yoke and positioning a rotation shaft and a magnet on an inner side of the motor coil substrate.

In the motor according to an embodiment of the present invention, even when a high voltage is applied, occurrence of a short circuit between the wirings is suppressed. A withstand voltage of the motor is ensured, and a motor with stable performance is obtained.

Obviously, numerous modifications and variations of the present invention are possible in light of the above teachings. It is therefore to be understood that within the scope of the appended claims, the invention may be practiced otherwise than as specifically described herein.

The invention claimed is:

1. A coil substrate, comprising:

a flexible substrate; and a coil comprising a plurality of turns formed in a staggered manner such that each of the turns includes a first wiring forming a half turn formed on a first surface of the flexible substrate and a second wiring forming a half turn formed on a second surface of the flexible substrate on an opposite side with respect to the first surface of the flexible substrate, wherein the coil is formed such that an inter-wiring distance between the first wiring of one of the turns and the first wiring of an adjacent one of the turns is larger than an inter-wiring distance between the second wiring of one of the turns and the first wiring of an adjacent one of the turns.

2. The coil substrate according to claim 1, wherein the coil is formed such that a width of the first wiring formed on the first surface of the flexible substrate is smaller than a width of the second wiring on the second surface of the flexible substrate.

3. The coil substrate according to claim 2, further comprising:

a second coil formed adjacent to the coil and comprising a plurality of turns formed in a staggered manner such that each of the turns includes a first wiring forming a half turn formed on the first surface of the flexible substrate and a second wiring forming a half turn formed on the second surface of the flexible substrate, wherein the second coil is formed such that a portion of the first wiring in each of the turns in the second coil and a portion of the second wiring in each of the turns on the coil are positioned to overlap each other in a direction perpendicular to the first surface of the flexible substrate.

4. The coil substrate according to claim 1, further comprising:

a second coil formed adjacent to the coil and comprising a plurality of turns formed in a staggered manner such that each of the turns includes a first wiring forming a half turn formed on the first surface of the flexible substrate and a second wiring forming a half turn formed on the second surface of the flexible substrate, wherein the second coil is formed such that a portion of the first wiring in each of the turns in the second coil and a portion of the second wiring in each of the turns on the coil are positioned to overlap each other in a direction perpendicular to the first surface of the flexible substrate.

5. A motor coil substrate, comprising:

the coil substrate of claim 1 wound in a cylindrical shape such that the first surface of the flexible substrate is positioned on an inner peripheral side of the cylindrical shape and that the second surface of the flexible substrate is positioned on an outer peripheral side of the cylindrical shape.

6. The motor coil substrate according to claim 5, wherein the coil is formed such that a width of the first wiring formed on the first surface of the flexible substrate is smaller than a width of the second wiring on the second surface of the flexible substrate.

7. The coil substrate according to claim 6, further comprising:

a second coil formed adjacent to the coil and comprising a plurality of turns formed in a staggered manner such that each of the turns includes a first wiring forming a half turn formed on the first surface of the flexible substrate and a second wiring forming a half turn formed on the second surface of the flexible substrate, wherein the second coil is formed such that a portion of the first wiring in each of the turns in the second coil and a portion of the second wiring in each of the turns on the coil are positioned to overlap each other in a direction perpendicular to the first surface of the flexible substrate.

8. The coil substrate according to claim 5, further comprising:

a second coil formed adjacent to the coil and comprising a plurality of turns formed in a staggered manner such that each of the turns includes a first wiring forming a half turn formed on the first surface of the flexible substrate and a second wiring forming a half turn formed on the second surface of the flexible substrate, wherein the second coil is formed such that a portion of the first wiring in each of the turns in the second coil and a portion of the second wiring in each of the turns on the coil are positioned to overlap each other in a direction perpendicular to the first surface of the flexible substrate.

9. A motor, comprising:

a cylindrical yoke;

the motor coil substrate of claim 5 positioned on an inner side of the cylindrical yoke;

a rotation shaft positioned on an inner side of the motor coil substrate; and a magnet positioned on the rotational shaft such that the rotational shaft and the magnet are positioned on the inner side of the motor coil substrate.

10. A coil substrate, comprising:

a flexible substrate; and a plurality of coils each comprising a plurality of turns formed in a staggered manner such that each of the turns includes a first wiring forming a half turn formed on a first surface of the flexible substrate and a second wiring forming a half turn formed on a second surface of the flexible substrate on an opposite side with respect to the first surface of the flexible substrate, wherein the plurality of coils is formed such that an inter-wiring distance between the first wiring of one of the turns and the first wiring of an adjacent one of the turns is larger than an inter-wiring distance between the second wiring of one of the turns and the first wiring of an adjacent one of the turns.

11. The coil substrate according to claim 10, wherein the plurality of coils is formed such that a width of the first wiring formed on the first surface of the flexible substrate is smaller than a width of the second wiring on the second surface of the flexible substrate.

12. The coil substrate according to claim 11, wherein the plurality of coils is formed such that a portion of the first wiring in one of the coils and a portion of the second wiring in an adjacent one of the coils are positioned to overlap each other in a direction perpendicular to the first surface of the flexible substrate.

13. The coil substrate according to claim 10, wherein the plurality of coils is formed such that a portion of the first wiring in one of the coils and a portion of the second wiring in an adjacent one of the coils are positioned to overlap each other in a direction perpendicular to the first surface of the flexible substrate.

14. A motor coil substrate, comprising:

the coil substrate of claim 10 wound in a cylindrical shape such that the first surface of the flexible substrate is positioned on an inner peripheral side of the cylindrical shape and that the second surface of the flexible substrate is positioned on an outer peripheral side of the cylindrical shape.

15. The motor coil substrate according to claim 14, wherein the plurality of coils is formed such that a width of the first wiring formed on the first surface of the flexible substrate is smaller than a width of the second wiring on the second surface of the flexible substrate.

16. The coil substrate according to claim 15, wherein the plurality of coils is formed such that a portion of the first wiring in one of the coils and a portion of the second wiring in an adjacent one of the coils are positioned to overlap each other in a direction perpendicular to the first surface of the flexible substrate.

17. The coil substrate according to claim 14, wherein the plurality of coils is formed such that a portion of the first wiring in one of the coils and a portion of the second wiring in an adjacent one of the coils are positioned to overlap each other in a direction perpendicular to the first surface of the flexible substrate.

18. A motor coil substrate, comprising:

a coil substrate wound in a cylindrical shape and comprising a flexible substrate and at least one coil comprising a plurality of turns formed in a staggered manner such that each of the turns includes a first wiring forming a half turn formed on a first surface of the flexible substrate and a second wiring forming a half turn formed on a second surface of the flexible substrate on an opposite side with respect to the first surface of the flexible substrate, wherein the coil substrate is formed such that the first surface of the flexible substrate is positioned on an inner peripheral side of the cylindrical shape and that the second surface of the flexible substrate is positioned on an outer peripheral side of the cylindrical shape, the at least one coil is formed such that an inter-wiring distance between the first wiring of one of the turns and the first wiring of an adjacent one of the turns is larger than an inter-wiring distance between the second wiring of one of the turns and the first wiring of an adjacent one of the turns, and the coil substrate is wound in the cylindrical shape such that a distance between top portions of the first wiring on the first surface of the flexible substrate is substantially equal to a distance between bottom portions of the second wiring on the second surface of the flexible substrate.

19. The motor according to claim 18, wherein the coil is formed such that a width of the first wiring formed on the first surface of the flexible substrate is smaller than a width of the second wiring on the second surface of the flexible substrate.

20. The motor according to claim 18, wherein the at least one coil comprises a plurality of coils each comprising the plurality of turns formed in the staggered manner such that each of the turns includes the first wiring forming the half turn formed on the first surface of the flexible substrate and the second wiring forming the half turn formed on the second surface of the flexible substrate, and the plurality of coils is formed such that a portion of the first wiring in one of the coils and a portion of the second wiring in an adjacent one of the coils are positioned to overlap each other in a direction perpendicular to the first surface of the flexible substrate.

* * * * *